United States Patent
Uchino et al.

(10) Patent No.: US 10,104,696 B2
(45) Date of Patent: Oct. 16, 2018

(54) USER APPARATUS, BASE STATION, CONTROL INFORMATION DETECTION METHOD AND CONTROL INFORMATION TRANSMISSION METHOD

(71) Applicant: NTT DOCOMO, INC., Tokyo (JP)

(72) Inventors: Tooru Uchino, Tokyo (JP); Kazuki Takeda, Tokyo (JP); Lan Chen, Tokyo (JP); Huiling Jiang, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 118 days.

(21) Appl. No.: 15/113,109

(22) PCT Filed: Jan. 23, 2015

(86) PCT No.: PCT/JP2015/051896
§ 371 (c)(1),
(2) Date: Jul. 21, 2016

(87) PCT Pub. No.: WO2015/115335
PCT Pub. Date: Aug. 6, 2015

(65) Prior Publication Data
US 2017/0013647 A1    Jan. 12, 2017

(30) Foreign Application Priority Data
Jan. 30, 2014 (JP) ................. 2014-016208

(51) Int. Cl.
*H04W 4/00* (2018.01)
*H04W 74/08* (2009.01)
(Continued)

(52) U.S. Cl.
CPC ......... *H04W 74/0833* (2013.01); *H04L 5/001* (2013.01); *H04L 5/0053* (2013.01);
(Continued)

(58) Field of Classification Search
CPC ................................ H04W 74/0833
(Continued)

(56) References Cited

U.S. PATENT DOCUMENTS

| 2013/0322387 A1* | 12/2013 | Kim | H04W 74/002 370/329 |
| 2014/0301330 A1* | 10/2014 | Lee | H04W 74/0833 370/329 |

FOREIGN PATENT DOCUMENTS

WO     2013/067310 A1    5/2013

OTHER PUBLICATIONS

Extended European Search Report dated Dec. 23, 2016, in corresponding European Patent Application No. 15743338.4 (10 pages).
(Continued)

*Primary Examiner* — Shripal Khajuria
(74) *Attorney, Agent, or Firm* — Osha Liang LLP

(57) ABSTRACT

A user apparatus that communicates with a base station in a mobile communication system, including: a reception unit configured to receive a radio signal from the base station by a downlink control channel; and a control information detection unit configured to detect control information, addressed to the user apparatus, mapped to a predetermined area in a time frequency resource of the downlink control channel by performing blind decoding in a plurality of candidate areas which are candidates of the predetermined area, wherein, the plurality of candidate areas are divided into a common candidate area where a plurality of user apparatuses commonly perform blind decoding and an individual candidate area for the user apparatus, and the control information detection unit performs blind decoding in the individual candidate area without performing blind decoding in the common candidate area during a period when the user apparatus monitors a random access response.

10 Claims, 14 Drawing Sheets

(51) Int. Cl.
*H04W 76/11* (2018.01)
*H04L 5/00* (2006.01)
*H04W 72/04* (2009.01)
*H04W 76/02* (2009.01)

(52) U.S. Cl.
CPC ......... *H04W 72/042* (2013.01); *H04W 74/08* (2013.01); *H04W 76/021* (2013.01); *H04W 76/11* (2018.02)

(58) Field of Classification Search
USPC .......................................................... 370/329
See application file for complete search history.

(56) References Cited

OTHER PUBLICATIONS

NEC Corporation, "Contention Based Random Access in SeNB", 3GPP TSG RAN2 Meeting #84, R2-134250, San Francisco, USA, Nov. 11-15, 2013 (2 pages).

Research in Motion, UK Limited, "Random Access Response in multiple TA", 3GPP TSG-RAN WG2 #77bis, Tdoc R2-121278, Jeju, South Korea, Mar. 26-30, 2012 (6 pages).

Panasonic, "Support of RACH procedure for SeNB", 3GPP TSG RAN WG2 Meeting #83bis, R2-133313, Ljubljana, Slovenia, Oct. 7-10, 2013 (2 pages).

International Search Report issued in PCT/JP2015/051896 dated Apr. 21, 2015 (1 page).

Written Opinion of the International Searching Authority issued in PCT/JP2015/051896 dated Apr. 21, 2015 (4 pages).

3GPP TSG-RAN WG2 Meeting #82; R2-131782; Huawei, HiSilicon; "Throughput results for inter-frequency deployment of small cells"; Fukuoka, Japan; May 20-24, 2013 (5 pages).

Office Action issued in the counterpart Japanese Patent Application No. 2014-016208, dated Oct. 24, 2017 (5 pages).

3GPP TS 36.321 V12.0.0; 3rd Generation Partnership Project; Technical Specification Group Radio Access Network; Evolved Universal Terrestrial Radio Access (E-UTRA); Medium Access Control (MAC) protocol specification (Release 12); Dec. 2013 (8 pages).

* cited by examiner

| CCE Aggregation level | THE NUMBER OF PDCCH CANDIDATES IN CSS | THE NUMBER OF PDCCH CANDIDATES IN USS |
|---|---|---|
| 1 | — | 6 |
| 2 | — | 6 |
| 4 | 4 | 2 |
| 8 | 2 | 2 |
| TOTAL NUMBER OF BDs | (4+2)×2 = 12 | (6+6+2+2)×(2 or 3) = 32 or 48 |

| | DCI format USED FOR BD |
|---|---|
| CSS | DCI format 1A and 1C; THE NUMBER OF CANDIDATES ×2 |
| USS | DCI format 1A and X without UL MIMO; THE NUMBER OF CANDIDATES ×2 |
| USS | DCI format 1A, X and 4 with UL MIMO; THE NUMBER OF CANDIDATES ×3 |

| CCE Aggregation level | THE NUMBER OF EPDCCH CANDIDATES IN USS |
|---|---|
| 1 | 6 |
| 2 | 4 |
| 4 | 3 |
| 8 | 2 |
| 16 | 1 |
| TOTAL NUMBER OF BDs | (6+4+3+2+1)×(2 or 3)= 32 or 48 |

FIG.7

| THE NUMBER OF BDs | Rel-11 CA | | | Dual Connectivity (DC) | |
|---|---|---|---|---|---|
| | Pcell | Scell | | MeNB | SeNB |
| CSS | 12 | 0 | | 12 | 12 |
| USS | 32 or 48 | 32 or 48 | | 32 or 48 | 32 or 48 |
| TOTAL | 12+0+32+32=76 or 12+0+48+48=108 | | | 12+12+32+32=88 or 12+12+48+48=120 | |

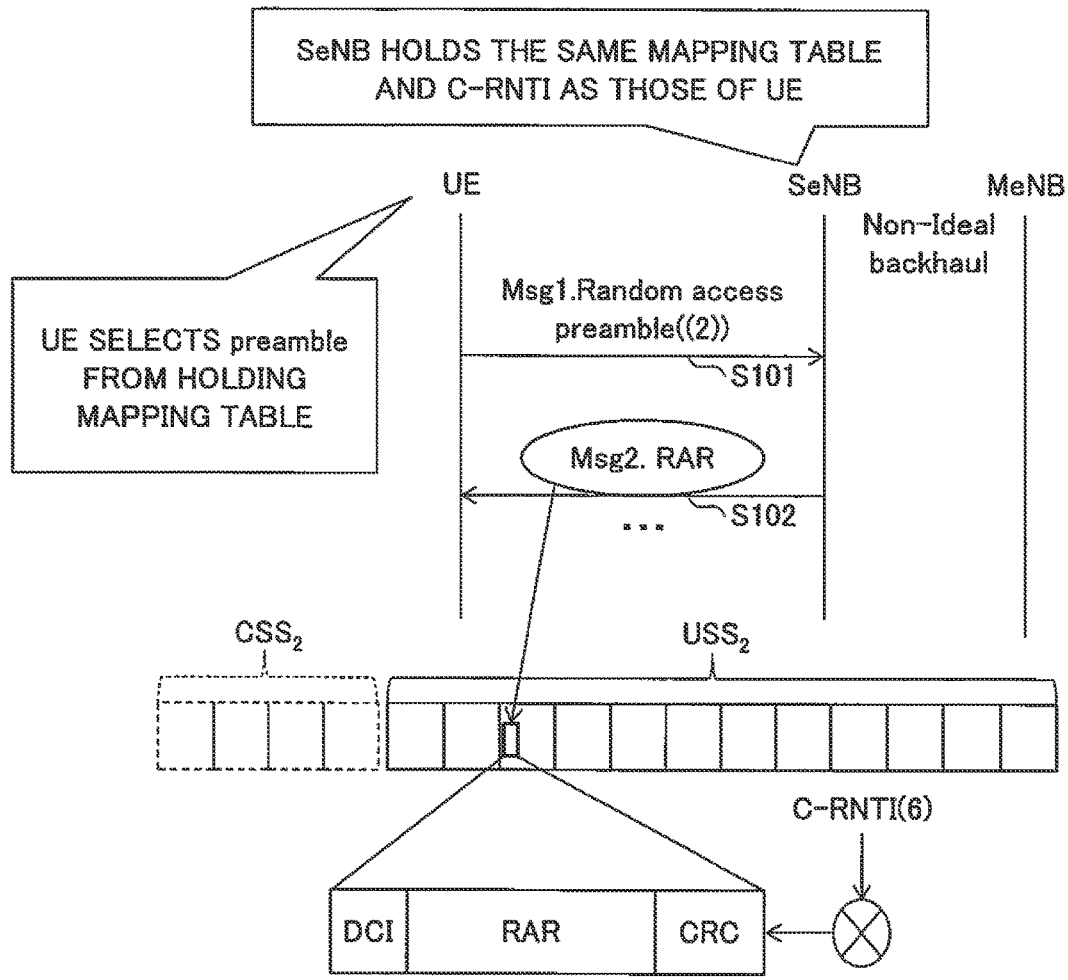

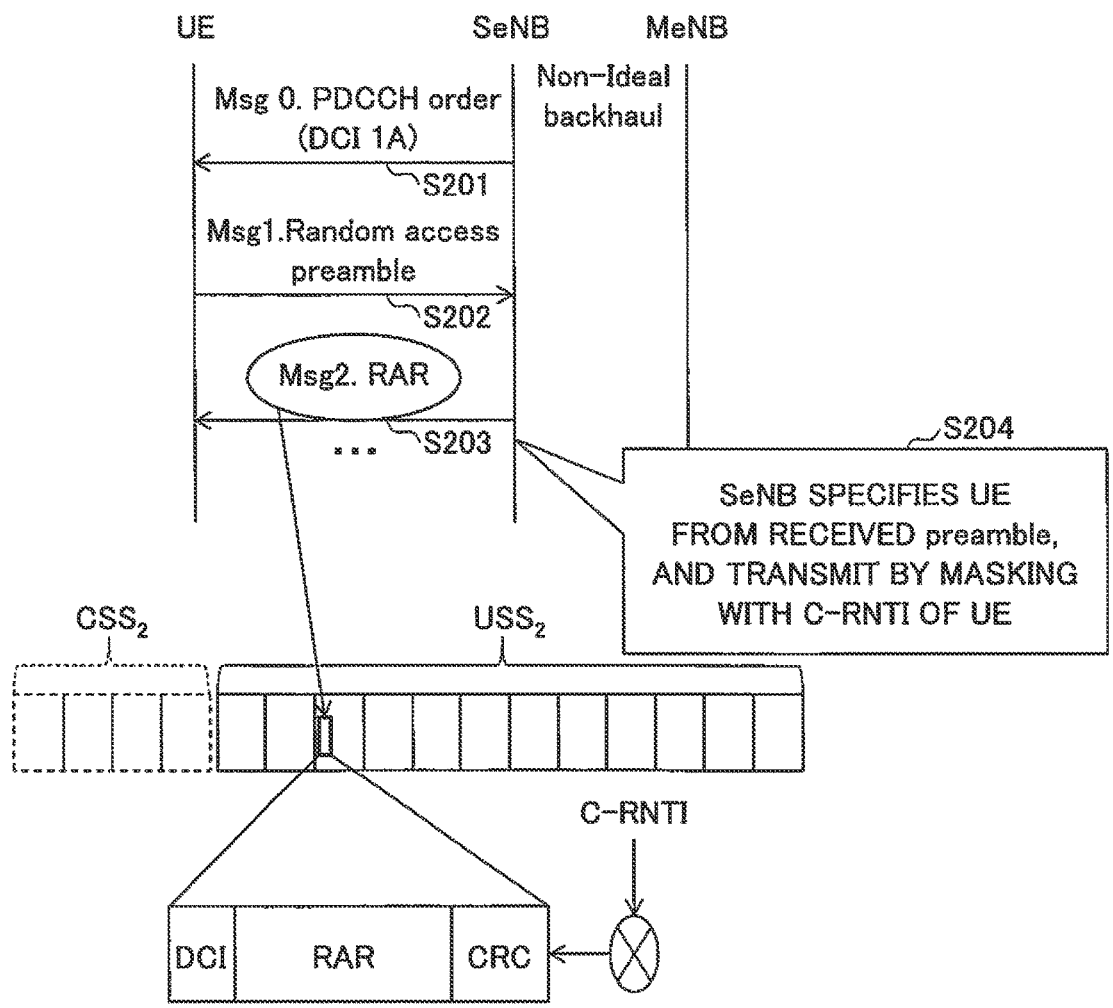

USER APPARATUS, BASE STATION, CONTROL INFORMATION DETECTION METHOD AND CONTROL INFORMATION TRANSMISSION METHOD

TECHNICAL FIELD

The present invention relates to a technique of random access in a mobile communication system of LTE and the like.

BACKGROUND ART

In an LTE (including LTE-Advanced) system, a random access procedure (RA procedure, to be referred to as RA procedure hereinafter) is performed in order to synchronize timing between a user apparatus UE and a base station eNB. The RA procedure is performed, for example, in a case where the user apparatus UE initially accesses the base station eNB, or in a case where re-synchronization is performed when handover is performed, or the like. Also, as the RA procedure, there are non-contention based (contention free) RA (to be referred to as contention free RA hereinafter) which is non-contention based, and contention based RA which is contention based. For example, contention free RA is used for handover and the like, and Contention based RA is used when a user apparatus UE initially originates a call, or the like.

In the LTE system, carrier aggregation (to be referred to as CA hereinafter) is introduced which enables communication by using a plurality of component carriers (to be referred to as CC hereinafter). As shown in FIG. 1, in CA up to Rel-10 of LTE, high throughput can be realized by performing simultaneous communication using a plurality of CCs under the the same base station eNB.

On the other hand, in Rel-12, this is further extended, so that dual connectivity (dual connectivity, to be also referred to as DC hereinafter) is being studies, in which simultaneous communication is performed by using CCs under different base stations eNB so as to realize high throughput (refer to non-patent document 1). For example, in a case where all CCs cannot be accommodated in a single base station eNB, dual connectivity is necessary to realize throughput similar to that of Rel-10.

In dual connectivity, a base station that forms a Pcell is called Master-eNB (MeNB), and a base station that forms an Scell is called Secondary-eNB (SeNB). FIG. 2 shows an example of dual connectivity. In the example of FIG. 2, a base station MeNB communicates with a user apparatus UE using a CC#1 (CC of Pcell), and a base station SeNB communicates with the user apparatus UE using a CC#2 (CC of Scell) so as to realize CA.

RELATED ART DOCUMENT

Non-Patent Document

[Non-PATENT DOCUMENT 1] 3GPP TSG-RAN WG2 Meeting #82 R2-131782

SUMMARY OF THE INVENTION

Problem to be Solved by the Invention

Regarding the RA procedure in the dual connectivity described in the background art, the RA procedure can be performed only in a Pcell in Rel-10 of LTE. On the other hand, an RA procedure in an Scell in addition to the Pcell is supported in Rel-11. However, only Contention free RA is supported, and an RAR (random access response) is received by the PCell. That is, even in an RA procedure in an Scell, the user apparatus UE receives an RAR from the base station MeNB.

FIG. 3 is a diagram compiling the above-mentioned supporting status. In the figure, Msg 0 is a message for assigning an RA preamble. Msg 1 is an RA preamble message, and Msg 3 is an RRC connection request, and Msg 4 is an RRC connection setup. As shown in FIG. 3, in the LTE Rel-10/11, in Contention based RA, an RA procedure that the base station SeNB participates in is not supported. Although an RA procedure that the base station SeNB participates in is supported in the Contention free RA, the RAR (Msg 2) is returned from the base station MeNB. In the following, when SeNB and MeNB are collectively referred to, it is described as eNB.

In Rel-12, in both of the Contention based RA and the Contention free RA, the RAR (Msg 2) is returned from the base station SeNB.

The RAR is transmitted from the base station eNB to the user apparatus UE by a PDCCH (including EPDCCH). The RAR includes an index of a random access preamble and timing information and the like. By the way, the substance of the RAR including such information is transmitted by a PDSCH corresponding to resource assignment information transmitted by the PDCCH. Although it is correct that a pointer of RAR is transmitted by the PDCCH, a description method of "RAR is transmitted by PDCCH" is also used for the convenience sake of explanation.

Although PDCCH is a channel for carrying, by its payload, a DCI including resource assignment information and the like, there is a case that PDCCH and DCI are used as having the same meaning. A DCI is transmitted with a CRC, in which the CRC is scrambled by identification information of a user apparatus UE that is a destination of the DCI (XOR calculation, more specifically). Thus, the user apparatus UE that receives the PDCCH uses a DCI, as a DCI addressed to the user apparatus UE, that can be normally decoded by a CRC descrambled by its identification information. The identification information is an RA-RNTI in an RA procedure, for example.

A PDCCH is transmitted to a plurality of user apparatuses UE in one subframe. Since each user apparatus UE does not ascertain by which resource the PDCCH addressed to itself is transmitted, the user apparatus UE performs operation of searching resources where there is a possibility that a PDCCH addressed to the user apparatus UE is transmitted so as to detect the PDCCH addressed to the user apparatus UE.

The area of resources where the search is performed is called a search space. As the search space, there are a common search space (to be referred to as CSS, hereinafter) which is a space that every user apparatus UE commonly searches, and a UE-specific search space (to be referred to as USS, hereinafter) which is a space that each user apparatus UE individually searches.

As the smallest unit for assigning a DCI, CCE (Control Channel Element) is defined, and further, aggregation levels indicating how many CCEs an DCI (PDCCH) is assigned to are defined. For example, there are four type of aggregation levels which are 1, 2, 4 and 8, each value corresponding to the number of CCEs for assignment. Also, the aggregation level is set for each user apparatus UE, based on CQI and the like fed back from the user apparatus UE, such that the aggregation level is low when reception quality is good and that the aggregation level is high when reception quality is bad. The CCE is provided with an index, so that, when the aggregation level is n, DCI is mapped using a CCE, as a start point, of an index of multiples of n.

In the case of CSS, CCEs are assigned in a section of 16 CCEs of 0-15, and aggregation levels are limited to 4 and 8. On the other hand, there is no limitation for aggregation levels in the case of USS.

The user apparatus UE does not know which CCE a PDCCH addressed to itself is assigned to, which aggregation level is used, and which DCI format is used. So, the user apparatus UE performs decoding for all possible candidates. This is called blind decoding (to be referred to as BD, hereinafter).

FIG. 4 is a diagram showing an example of a PDCCH that the user apparatus UE receives in a case where an RAR is transmitted from the base station SeNB like in Rel-12 of FIG. 3. As shown in FIG. 4, the user apparatus UE transmits an RA preamble to the base station SeNB, and receives an RAR from the base station SeNB. A period of an Ra-Response Window during which reception of RAR is expected starts after elapse of a predetermined period after the RA preamble is transmitted. During the Window period, searching (BD) of RAR is performed.

On the other hand, there is a possibility that the user apparatus UE receives a PDCCH (Paging, SI, RAR, and the like) addressed to the user apparatus UE also from the base station MeNB during the period of the Ra-Response Window. Thus, the user apparatus UE also performs search (BD) for the PDCCH addressed to the user apparatus UE.

In the example of FIG. 4, as an example, the aggregation level is 4 for both PDCCHes, so that the user apparatus UE performs BDs for the CSS and the USS for each of the PDCCH transmitted from the base station MeNB and the PDCCH transmitted from the base station SeNB.

FIG. 5 shows a diagram indicating the number of candidates of PDCCHes for which decoding is tried when PDCCH is used. As shown in the figure, as to the CSS, there are 4 candidates when aggregation level is 4, and there are 2 candidates when aggregation level is 4. In each case, since there are 2 types as possible DCI formats, total number of candidates is 12. By similar calculation, the number of candidates for the USS is 32 (when there is not UL MIMO), or 48 (where there is UL MIMO). Hereinafter, the number of candidates of BDs is referred to as the number of BDs. By the way, one time BD includes CRC descrambling at a position of assumed resources and decoding (CRC check and the like) of DCI in an assumed DCI format.

FIG. 6 is a diagram showing the number of candidates for trying decoding when an EPDCCH is used. Since the EPDCCH is a UE-specific control signal, it is not transmitted by CSS, and only USS is defined. As shown in FIG. 6, the number of BDs is 32 or 48. In the EPDCCH, although Localized mapping and Distributed mapping are defined, the example of FIG. 6 shows an example in the Distributed mapping.

As shown in FIG. 4, in dual connectivity, when CSS is supported in the SCell, the number of BDs increases by that. That is, as shown in FIG. 7, in CA of Rel-11, since RAR mapped to a CSS is not transmitted in an Scell, the number of BDs at the part is 0. On the other hand, when the CSS is supported in the Scell in dual connectivity, the number of BDs increases by 12 for detecting an RAR mapped to a CSS transmitted from the base station SeNB.

When the number of BDs increases, battery consumption of the user apparatus UE increases, and the number of decodings performed by the user apparatus UE per a unit time increases, so that implementation of the user apparatus UE becomes complicated and the number of False alarms increases.

The present invention is contrived in view of the abovementioned points, and an object of the present invention is to provide a technique for decreasing the number of candidates that become targets of blind decoding performed when receiving control information transmitted by a downlink control channel in a user apparatus.

Means for Solving the Problem

According to an embodiment of the present invention, there is provided a user apparatus that communicates with a base station in a mobile communication system, including:

a reception unit configured to receive a radio signal from the base station by a downlink control channel; and a control information detection unit configured to detect control information, addressed to the user apparatus, mapped to a predetermined area in a time frequency resource of the downlink control channel by performing blind decoding in a plurality of candidate areas which are candidates of the predetermined area, wherein, the plurality of candidate areas are divided into a common candidate area where a plurality of user apparatuses commonly perform blind decoding and an individual candidate area for the user apparatus, and the control information detection unit performs blind decoding in the individual candidate area without performing blind decoding in the common candidate area during a period when the user apparatus monitors a random access response.

Also, according to an embodiment of the present invention, there is provided a base station that performs communication with a user apparatus in a mobile communication system, including:

a mapping unit configured to map control information, addressed to the user apparatus, to a predetermined area in a time frequency resource of a downlink control channel; and a transmission unit configured to transmit the control information, as a radio signal, by a downlink control channel using a time frequency resource of the predetermined area, wherein the predetermined area is an area among a plurality of candidate areas where blind decoding is performed for detecting the control information in the user apparatus, the plurality of candidate areas are divided into a common candidate area where a plurality of user apparatuses commonly perform blind decoding and an individual candidate area for the user apparatus, and the mapping unit selects the predetermined area from the individual candidate area during a period when the user apparatus monitors a random access response.

Also, according to an embodiment of the present invention, there is provided a control information detection method executed by a user apparatus that communicates with a base station in a mobile communication system, including:

a reception step of receiving a radio signal from the base station by a downlink control channel; and a control information detection step of detecting control information, addressed to the user apparatus, mapped to a predetermined area in a time frequency resource of the downlink control channel by performing blind decoding in a plurality of candidate areas which are candidates of the predetermined area, wherein, the plurality of candidate areas are divided into a common candidate area where a plurality of user apparatuses commonly perform blind decoding and an individual candidate area for the user apparatus, and in the control information detection step, the user apparatus performs blind decoding in the individual candidate area without performing blind decoding in the common candidate area during a period when the user apparatus monitors a random access response.

Also, according to an embodiment of the present invention, there is provided a control information transmission method executed by a base station that performs communication with a user apparatus in a mobile communication system, including:

a mapping step of mapping control information, addressed to the user apparatus, to a predetermined area in a time frequency resource of a downlink control channel; and a transmission step of transmitting the control information, as a radio signal, by a downlink control channel using a time frequency resource of the predetermined area, wherein the predetermined area is an area among a plurality of candidate areas where blind decoding is performed for detecting the control information in the user apparatus, the plurality of candidate areas are divided into a common candidate area where a plurality of user apparatuses commonly perform blind decoding and an individual candidate area for the user apparatus, and in the mapping step, the base station selects the predetermined area from the individual candidate area during a period when the user apparatus monitors a random access response.

Effect of the Present Invention

According to an embodiment of the present invention, it becomes possible to decrease the number of candidates that become targets of blind decoding performed when receiving control information transmitted by a downlink control channel in a user apparatus.

BRIEF DESCRIPTION OF THE DRAWINGS

FIG. 5 is a diagram showing the number of candidates of PDCCH for which decoding is tried when using PDCCH;

FIG. 6 is a diagram showing the number of candidates for which decoding is tried when using EPDCCH;

FIG. 7 is a diagram indicating the number of BDs in CA of Rel-11 and Dual connectivity;

FIG. 10 is a sequence example in Contention-based RA;

FIG. 11 is a diagram showing that the number of BDs of CSS in the base station SeNB is reduced to 0;

FIG. 12 is a sequence diagram in Contention-free RA;

FIG. 13 is a diagram showing that the number of BDs of CSS in the base station SeNB is reduced to 0;

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below.

(System Whole Configuration, and Outline of Embodiment)

Figure 1:
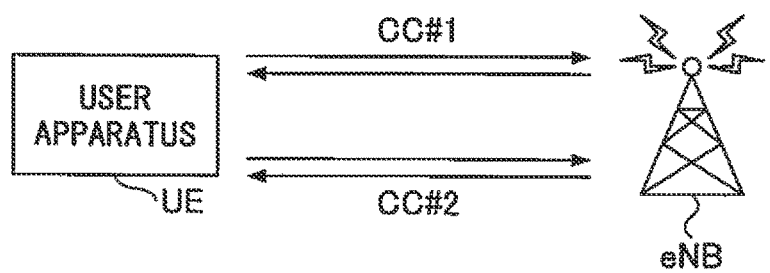
FIG. 1 is a diagram showing CA up to Rel-10.
Figure 2:
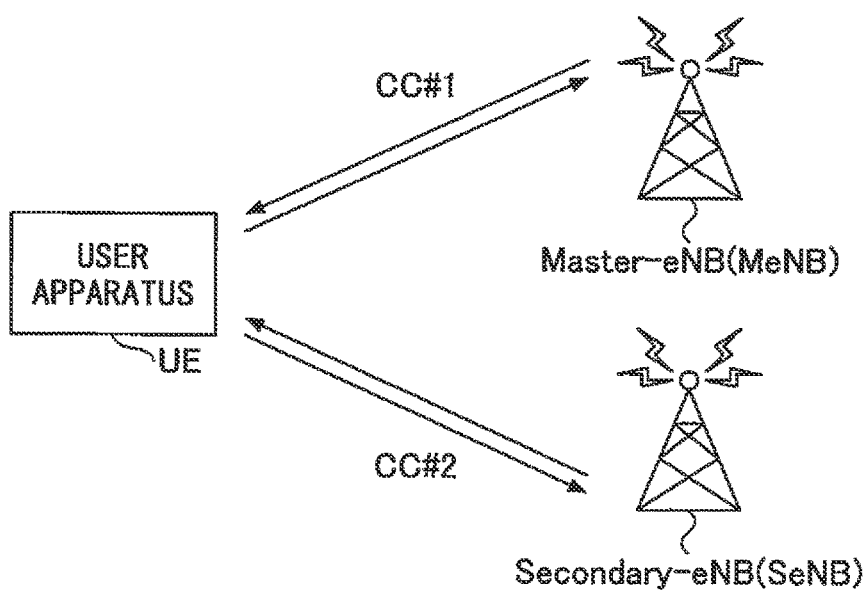
FIG. 2 is a diagram showing an example of Dual connectivity.
Figures 8, 9:
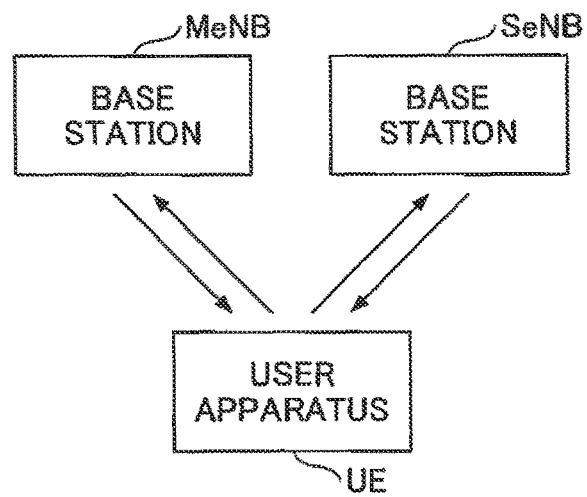
FIG. 8 is a block diagram of a mobile communication system in an embodiment of the present invention.
FIG. 9 is a diagram showing a mapping table between preamble numbers and C-RNTIs.

FIG. 8 shows a configuration example of a mobile communication system of an embodiment of the present invention. As shown in FIG. 8, the mobile communication system of the present embodiment is a system similar to the mobile communication system shown in FIG. 2, and includes a base station MeNB forming a Pcell, and a base station SeNB forming an Scell so as to provide a radio communication service of dual connectivity to the user apparatus UE. In the present embodiment, description is provided assuming that the user apparatus UE does not support UL MIMO. However, this is merely an example, and the technique of the present invention can be applied to a case where the user apparatus UE supports UL MIMO. Also, it is assumed that the mobile communication system (user apparatus and base station) of the present embodiment includes functions defined in Rel-12 of LTE as basic functions. However, the present invention can be applied to other communication schemes.

Figure 3:
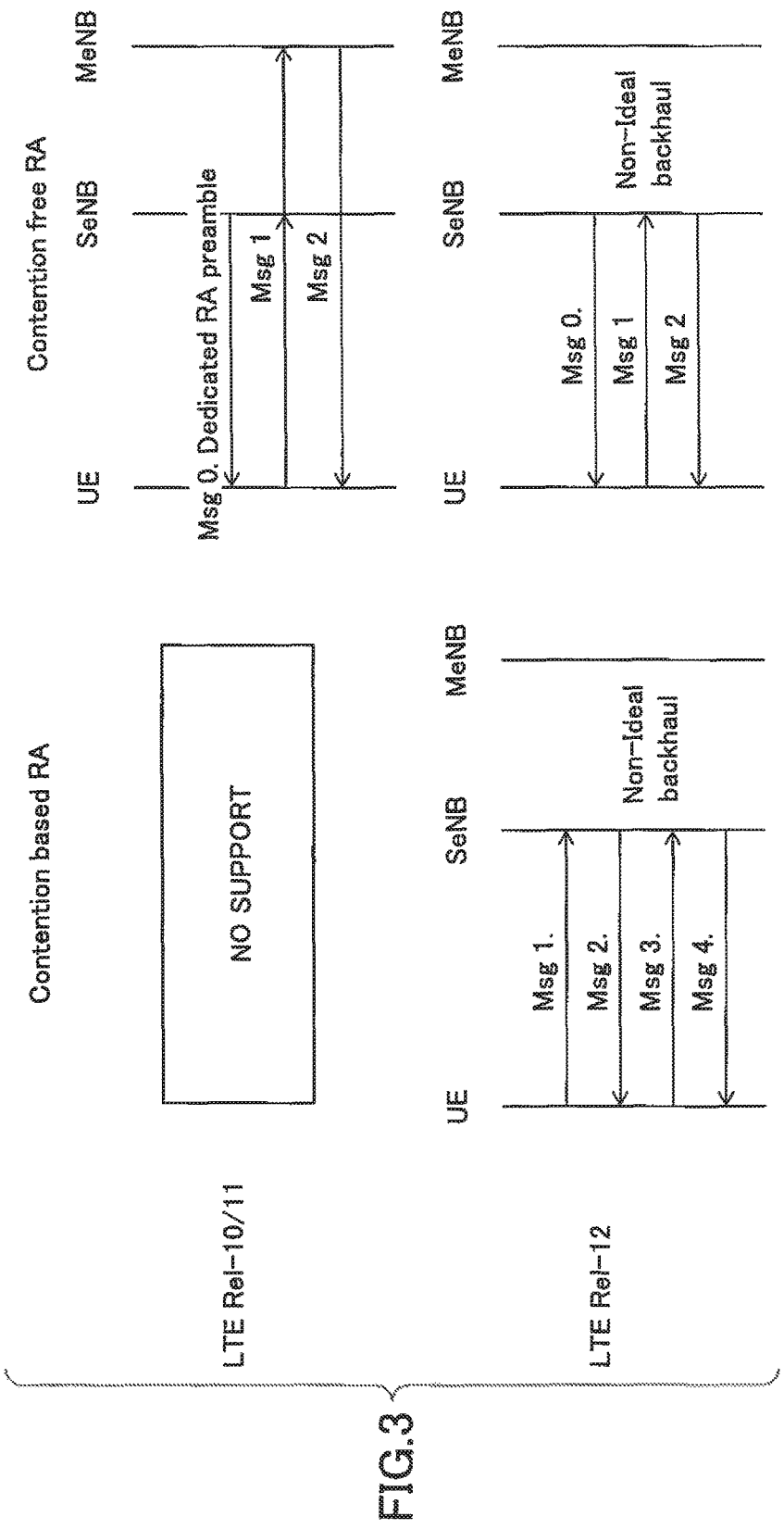
FIG. 3 is a diagram showing an RA procedure of Dual connectivity.
Figure 4:
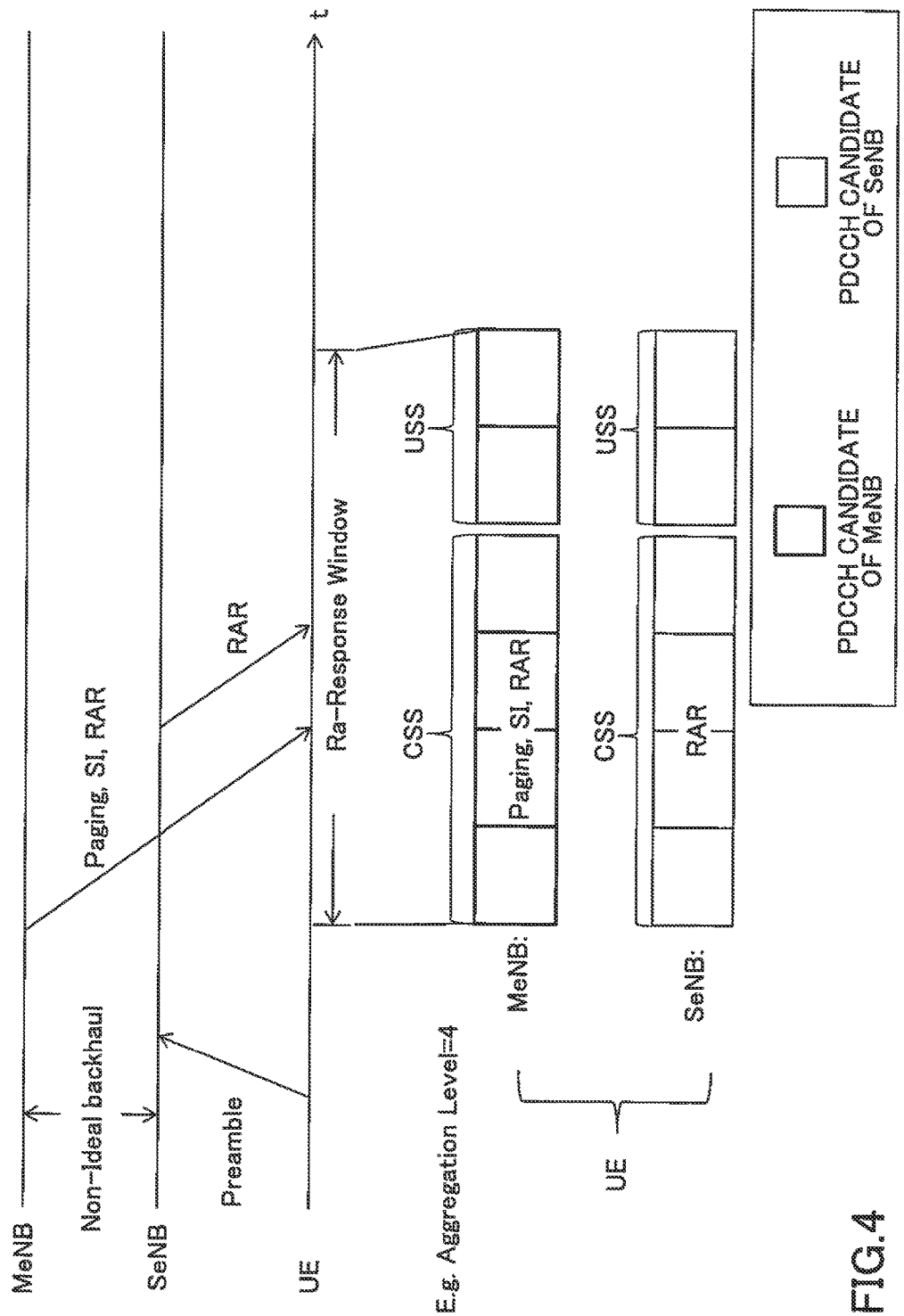
FIG. 4 is a diagram showing an example of PDCCH that the user apparatus UE receives.

The base station SeNB in the mobile communication system in the present embodiment supports the RA procedure as shown in the lower part of FIG. 3. That is, in either Contention based RA or Contention free RA, the user apparatus UE receives an RAR from the base station SeNB. Therefore, the user apparatus UE performs BD in a CSS of a PDCCH received from the base station SeNB. As described before, if any measure for this is not taken, the number of BDs increases, so that a problem of consumed power increase and the like occurs. In the present embodiment, in order to solve this problem, the number of BDs is decreased to that of CA of Rel-11. By the way, in the following, "PDCCH" is used as a term including meaning of "EPDCCH" unless it is described as distinguished from EPDCCH.

In the following, a reduction example in Contention based RA and a reduction example in Contention-free RA are described respectively.

(Reduction Example in Contention Based RA)

In a conventional operation in the Contention based RA, first, the user apparatus UE selects one preamble from a group (set) of preambles held beforehand, and transmits it to the base station eNB. The base station eNB uses an RA-RNTI corresponding to a resource (time/frequency) by which the preamble is received as identification information of the user apparatus UE, so as to map an RAR (pointer of RAR, that is DCI) including CRC scrambled with the RA-RNTI onto a CSS of a PDCCH, and transmit it. During a period during which the user apparatus UE expects reception of an RAR, the user apparatus UE performs BD of the CSS using the RA-RNTI so as to receive the RAR.

On the other hand, in the present embodiment, the base station SeNB uses a C-RNTI (cell-RNTI) without using the RA-RNTI, and transmits an RAR using a USS, so that the user apparatus UE reduces BDs in the CSS of the PDCCH from the base station SeNB in the RA procedure. Since the C-RNTI is an RNTI used for transmission of UE-specific control information and the like, the user apparatus UE performs BD using the C-RNTI in the USS instead of in the CSS.

In the present embodiment, each of the user apparatus UE and the base station SeNB holds beforehand a mapping table between a number of a preamble and a C-RNTI as shown in FIG. 9. In this table, each number corresponding to a sequence of a preamble is associated with a plurality of C-RNTIs. Also, in the present embodiment, one row in the table of FIG. 9 is activated for the user apparatus UE. The activation is already performed to the user apparatus UE by an RRC signaling or by a PDCCH from the base station MeNB or the base station SeNB. Also, for example, the base station SeNB may ascertain which row is activated based on information received from the base station MeNB or may ascertain which row is activated based on a resource by which a preamble is received from the user apparatus UE.

FIG. 10 shows an example of a sequence. As mentioned above, each of the user apparatus UE and the base station SeNB holds the table shown in FIG. 9.

The user apparatus UE transmits an RA preamble (step 101). For example, this RA preamble is a preamble whose number is 2. Also, if it is assumed that the first row is activated as shown is FIG. 9, the base station SeNB selects "6" of the first row corresponding to the number 2 of the preamble as a C-RNTI of the user apparatus UE from the table shown in FIG. 9. Then, the base station SeNB transmits a DCI (RAR) to which a CRC scrambled with the C-RNTI is added to the user apparatus UE by mapping it to the USS of the PDCCH (step 102).

The user apparatus UE performs BD only for the USS without performing BD of the CSS in BD for the PDCCH of the base station SeNB.

By such a control, as shown in FIG. 11, the number of BDs of CSS of the base station SeNB is reduced to 0.

As mentioned above, in the present embodiment, by providing one-to-one correspondence relationship between a C-RNTI to be assigned and an RA-preamble, the base station SeNB can uniquely specify a user apparatus UE that transmits a received RA preamble.

On the other hand, there is a possibility that an existing user apparatus UE (legacy UE) may connect to the base station SeNB. Therefore, it is necessary to individually assign resources to avoid that a user apparatus UE connecting to the base station SeNB as SeNB in dual connectivity collides with an existing user apparatus UE.

An example 1 of a scheme for assigning resources individually is to individually assign an RA preamble that can be transmitted. In the example 1, the base station SeNB designates, to the existing user apparatus UE, an RA preamble (by RACH configuration of RRC) that can be transmitted, and the base station SeNB assigns remaining preambles to user apparatuses UE which connect to the base station as SeNB.

An example 2 is to restrict RA transmission timing. That is, the base station SeNB designates a transmission position (timing) of an RA preamble that can be transmitted to each of the existing user apparatus UE and the user apparatus UE that connects to the base station as SeNB. Also, it is possible to carry out the example 1 and the example 2 by combining them.

(Reduction Example in Contention Free RA)

In a procedure in the Contention free RA, in the previous stage, the base station SeNB has a user apparatus UE-specific preamble (dedicated preamble), and also, has a C-RNTI of the user apparatus UE. However, in a conventional operation, transmission of an RAR was performed by mapping on a CSS using an RA-RNTI in the same way as the Contention based RA.

On the other hand, in the present embodiment, the base station SeNB uses a C-RNTI without using an RA-RNTI to transmit an RAR using a USS, so that the user apparatus UE reduces BDs in the CSS of a PDCCH from the base station SeNB.

FIG. 12 shows an example of a sequence in the Contention free RA in the present embodiment. First, the base station SeNB notifies the user apparatus UE of a dedicated preamble by a message 0 (step 201). The user apparatus UE transmits the dedicated preamble to the base station SeNB as a message 1 (step 202).

The base station SeNB transmits, to the user apparatus UE, a DCI (RAR) to which a CRC scrambled with the C-RNTI, that is already held, is added by mapping it to the USS of the PDCCH (step 203).

In BD for the PDCCH of the base station SeNB, the user apparatus UE performs BD in the USS without performing BD in the CSS. Also, the user apparatus UE holds the C-RNTI so as to perform BD in the USS by using the C-RNTI. This C-RNTI is one assigned from the base station SeNB or MeNB, for example. By such a control, as shown in FIG. 13, the number of BDs for the CSS of the base station SeNB is reduced to 0.

(Whole Sequence)

Figure 14:
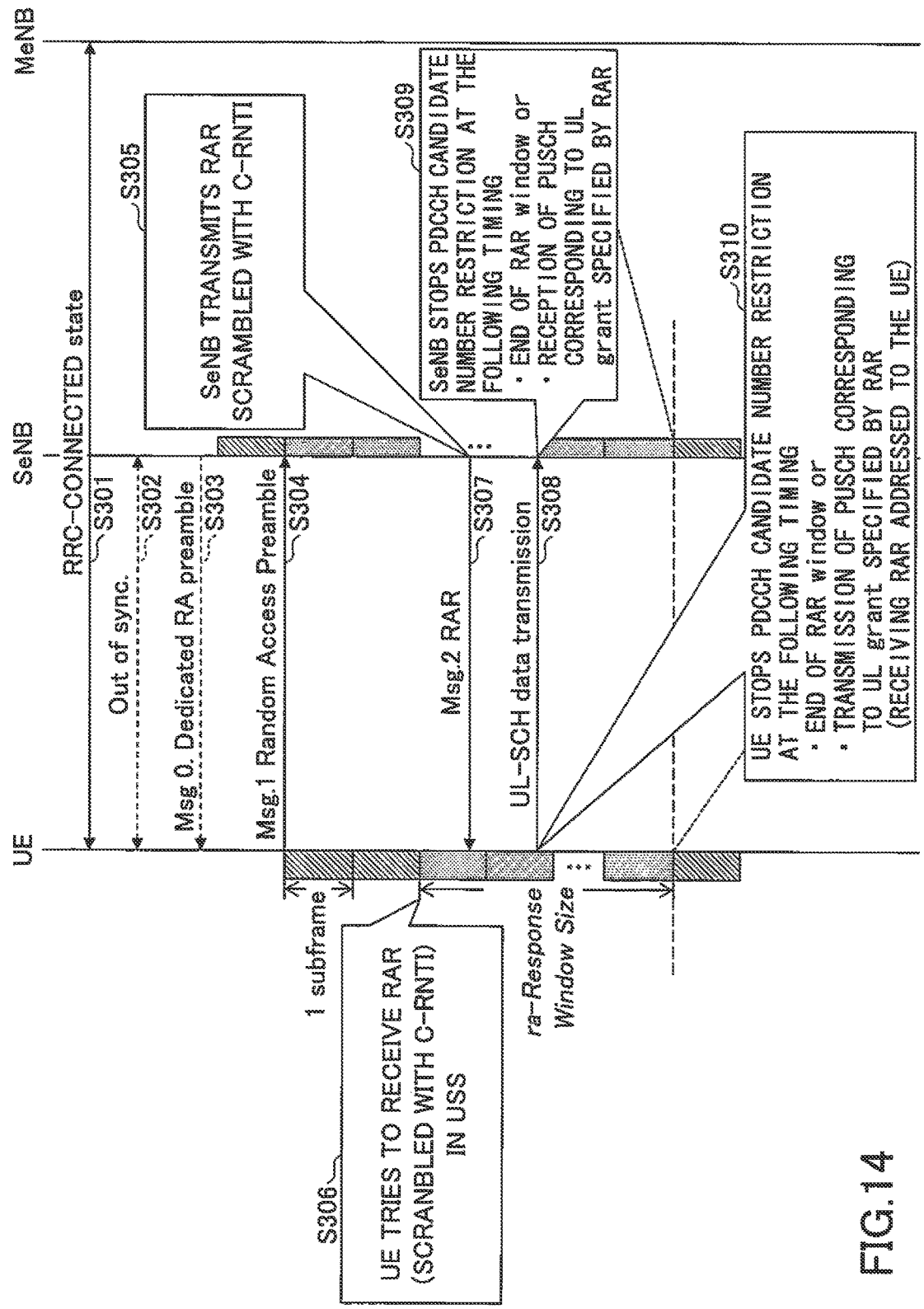
FIG. 14 is a whole sequence diagram in an embodiment of the present invention.

FIG. 14 shows a whole sequence example of the present embodiment. In this example, first, the user apparatus UE and the base station MeNB are in an RRC connected state (step 301), and there is no connection between the user apparatus UE and the base station SeNB, so that they are in an out-of-synchronization state (step 302). Since the user apparatus UE and the base station MeNB are in an RRC connected state, the user apparatus UE is monitoring the PDCCH from the base station MeNB to perform BD during the whole period shown in FIG. 14. Also, the base station SeNB notifies the user apparatus UE of a dedicated preamble (step 303). By the way, step 303 is unnecessary when performing Contention based RA.

A random access preamble (message 1) is transmitted from the user apparatus UE to the base station SeNB (step 304). The base station SeNB that has received the random access preamble transmits an RAR scrambled by the C-RNTI in the USS (step 305).

In the user apparatus UE, after a predetermined period (two subframes) from transmission of the random access preamble, an ra-Response Window period starts for waiting for an RAR, so that the user apparatus UE tries to receive an RAR scrambled by the C-RNTI in the USS with the start of the period. That is, the user apparatus UE skips BD in the CSS, and performs BD in the USS (step 306). That is, although the user apparatus UE receives PDCCHes from the base station SeNB and the base station MeNB, the user apparatus UE does not perform BD in the CSS for the PDCCH received from the base station SeNB so that the number of BDs is decreased.

The user apparatus UE receives the RAR (message 2) (step 307), and performs UL-SCH data transmission (UL data transmission) based on the assignment information (step 308). In the base station SeNB, when the ra-Response Window period ends, or when a PUSCH corresponding to an UL grant specified by the RAR is received, RAR transmission is not performed after that. Thus, at that time, the base station SeNB releases the PDCCH candidate number restriction (step 309).

On the other hand, in the user apparatus UE, at a timing when the ra-Response Window ends or when PUSCH transmission (the above-mentioned UL-SCH data transmission) corresponding to the UL grant specified by the RAR is performed (which means receiving an RAR addressed to the user apparatus UE), the user apparatus UE stops BD based on the PDCCH candidate number restriction of the base station SeNB, so as to return to a normal operation (step 310).

(On Multiplexing of MAC RAR and MAC SDU)

In general, in the case where an RA procedure is running between the user apparatus UE and the base station eNB, it is assumed that scheduling of DL/UL is stopped. This is because, it is assumed that UL synchronization is not established or some sort of abnormality occurs since the RA procedure is being performed.

On the other hand, in an RA procedure of dual connectivity shown in FIG. 14, even when the RA procedure is activated, since it is assumed that a PUCCH (MAC-ACK/NACK) can be fed back in a cell other than a serving cell where the RA procedure is activated, it is not necessary to stop at least DL scheduling.

Figure 15:
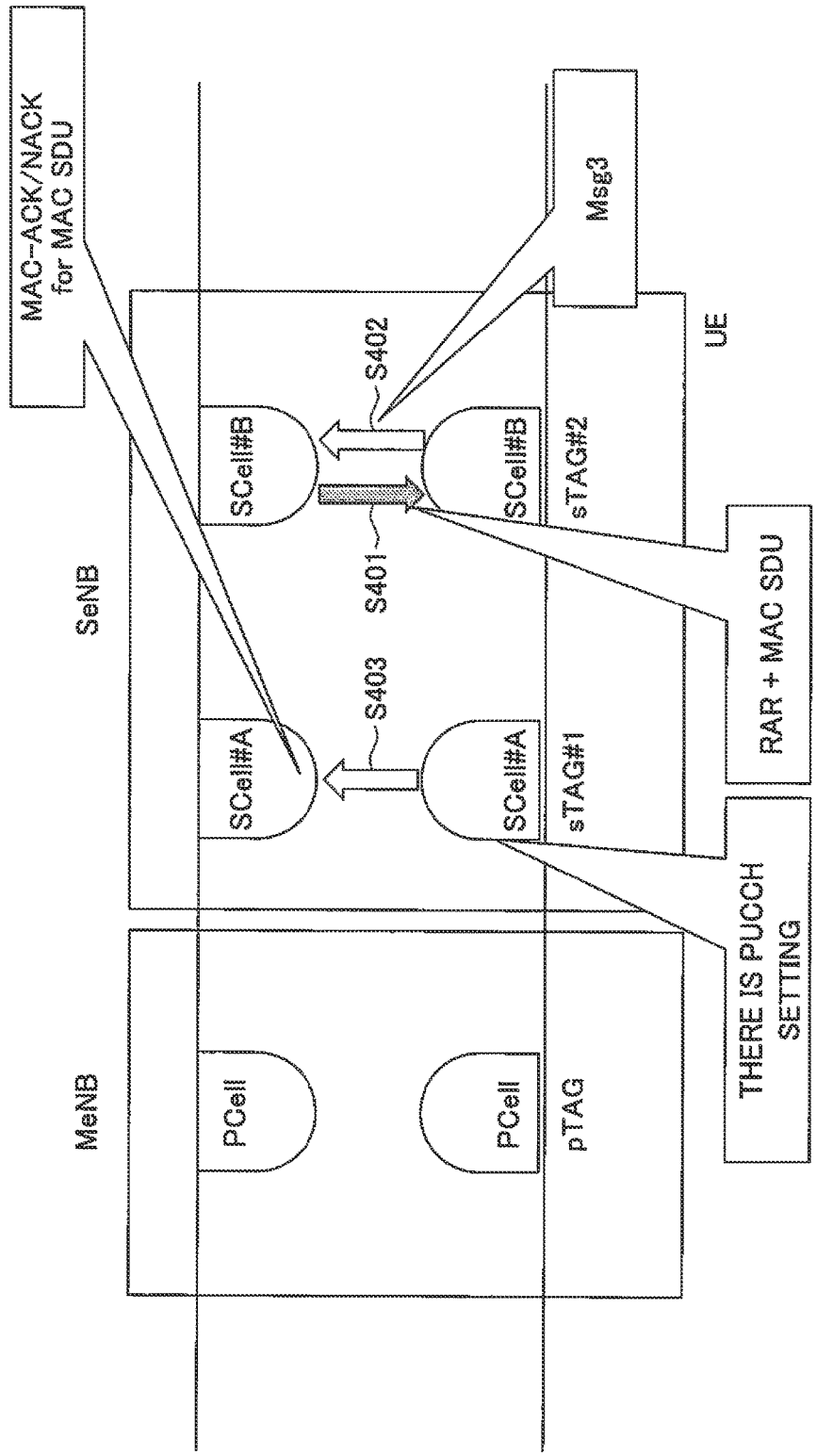
FIG. 15 is a diagram for explaining a case in which an RAR and a MAC SDU are multiplexed.

For example, as shown in FIG. 15, a case is considered where the user apparatus UE is performing dual connectivity with the base station MeNB and the base station SeNB. In the example shown in FIG. 15, the user apparatus UE communicates with the base station MeNB by a PCell, and communicates with the base station SeNB by two Scells (Scell#A, Scell#B). For example, in a case where UL synchronization is established and a PUCCH is set in the Scell#A, it is assumed that an RA procedure (Contention free RA) is performed in the Scell#B. In this case, even in the state where UL synchronization is not established in the Scell#B, the user apparatus UE can transmit ACK/NACK, in the Scell#A, for data (MAC SDU) that is received from the base station SeNB in the Scell#B.

Therefore, in the RA procedure of the Scell#B, it is not necessary to stop DL scheduling. Thus, in the present embodiment, in the Scell#B of FIG. 15, the base station SeNB transmits an RAR and a MAC SDU to the user apparatus UE by multiplexing them (step 401). The message 3 in the RA procedure is returned to the base station SeNB from the user apparatus UE by an uplink resource assigned by the RAR in the Scell#B (step 402). On the other hand, MAC ACK/NACK for the MAC data is returned to the base station SeNB from the user apparatus UE by a PUCCH set in the Scell#A (step 403).

Figure 16:
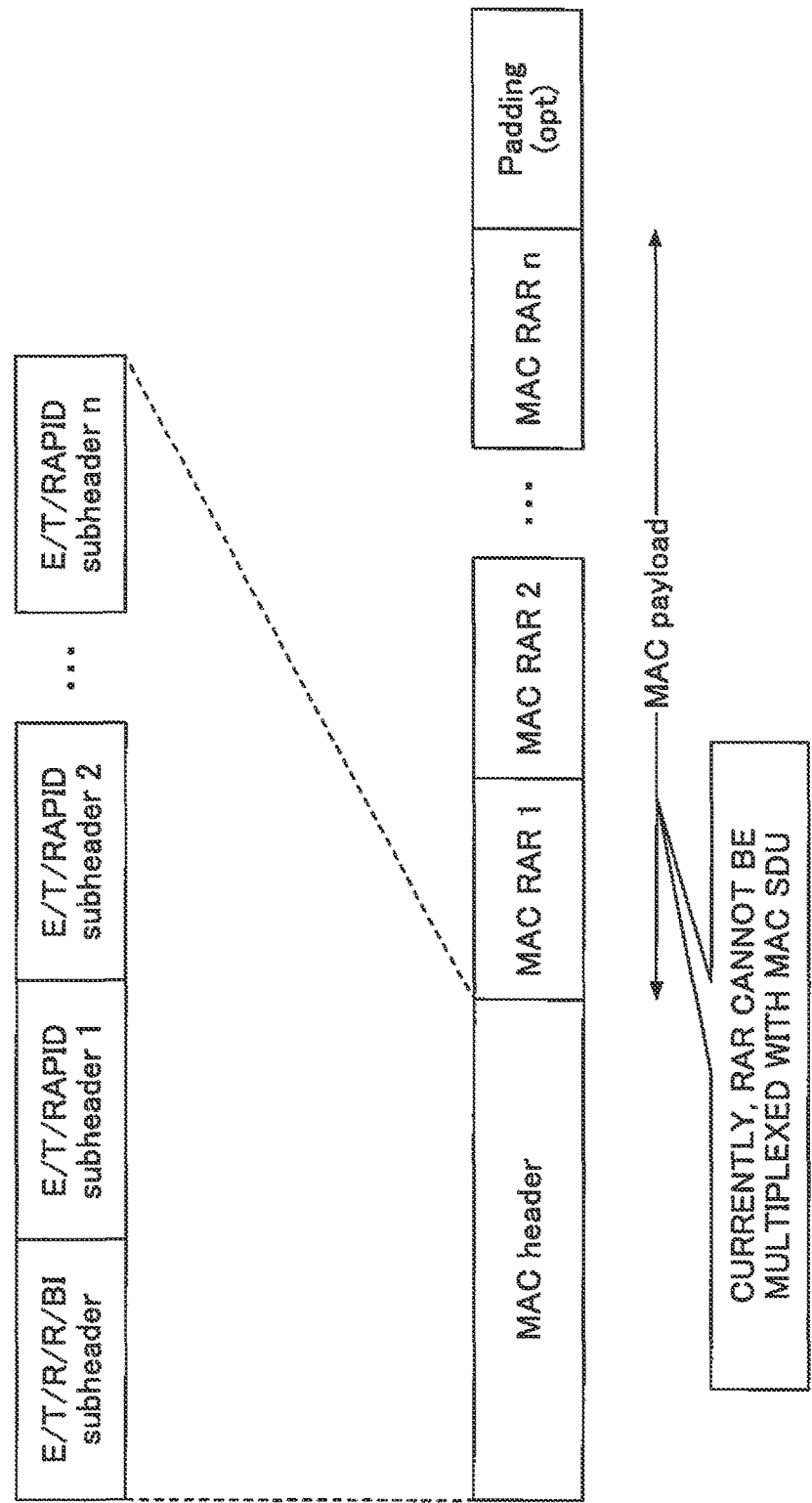
FIG. 16 is a diagram showing an existing MAC RAR.

In the following, a scheme example for multiplexing an RAR and a MAC SDU is described. Currently, a MAC PDU format for transferring an RAR is defined, which is as shown in FIG. 16. The MAC PDU includes a MAC header and a MAC payload. A plurality of MAC RARs are stored in the MAC payload. Each individual MAC RAR includes a timing advance, an UL grant, a temporary C-RNT and the like. Also, the MAC header includes a plurality of subheaders each corresponding to a respective MAC RAR. Each subheader includes E/T/R/R/BI and the like.

In an example 1 in which an RAR and a MAC SDU are multiplexed, the RAR and the MAC SDU/MAC CE are stored in different MAC PDUs. That is, a MAC PDU including the RAR and a normal MAC PDU including a MAC SDU/MAC CE are multiplexed.

In the example 1, the base station eNB continues DL scheduling during the RA procedure to transmit data by including it in a MAC SDU. On the other hand, an RAR related to the RA procedure is transmitted by a MAC PDU for RAR.

The user apparatus UE executes processing on each of the MAC PDU for RAR and the MAC PDU including the MAC SDU, so as to perform UL transmission of steps 402 and 403 as shown in FIG. 15, for example. In RAR reception, the user apparatus UE tries RAR reception using a C-RNTI instead of an RA-RNTI within the RAR window, so that the user apparatus UE regards reception of an RAR addressed to itself as completion of the RA procedure. Also, in the example 1, when the user apparatus UE detects that an RAR and a MAC SDU are multiplexed in a MAC PDU, the user apparatus UE determines that the MAC PDU is an invalid PDU so as to discard the MAC PDU. For example, when the E-field of the RAR subheader is 1, it can be determined that the RAR and the MAC SDU are multiplexed. But, determination method for determining whether the RAR and the MAC SDU are multiplexed is not limited to this, and it can be determined by other methods.

Figure 17:
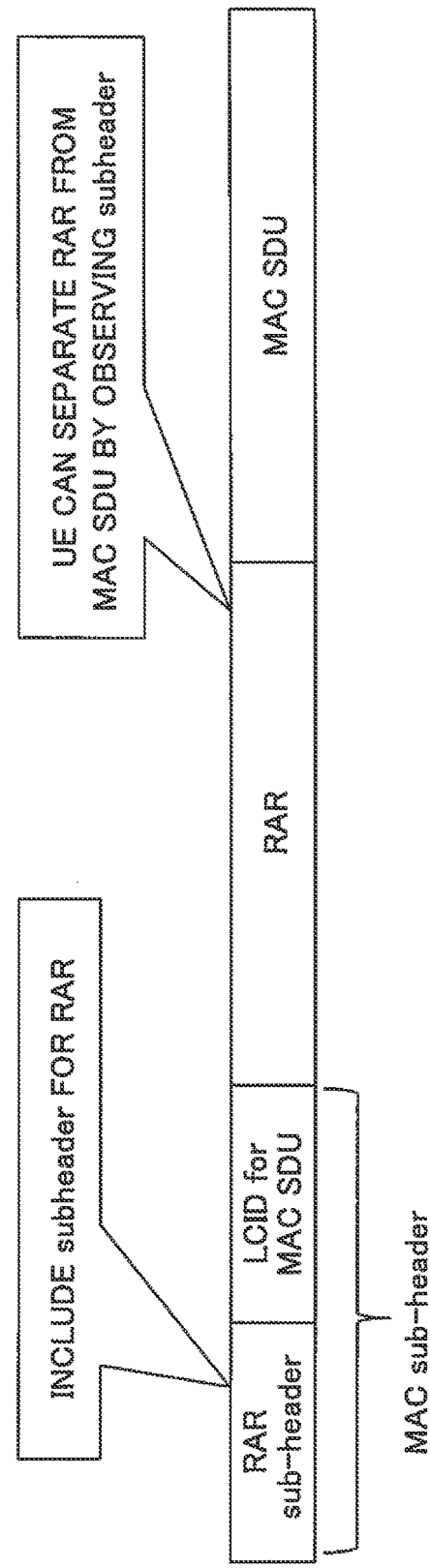
FIG. 17 is a diagram showing an example of a format of a MAC PDU in a case where an RAR and a MAC SDU are multiplexed.

Next, an example 2 is described in which an RAR and a MAC SDU are multiplexed. In the example 2, an RAR and a MAC SDU/MAC CE are multiplexed in a same MAC PDU. An example of a format of a MAC PDU in the example 2 is shown in FIG. 17. As shown in FIG. 17, a subheader for the RAR is newly defined so that the subheader is included in a field of the MAC subheader. In the Payload, an RAR and a MAC SDU are multiplexed. The subheader for the RAR may include, for example, all or a part of information defined for the subheader of the MAC RAR currently.

Also, in the example 2, the base station eNB continues DL scheduling during the PA procedure. When data transmission assignment and an RAR occur at the same time, the base station eNB includes data in the MAC SDU, so as to transmit the RAR and the MAC SDU by multiplexing them.

On the other hand, the user apparatus UE tries RAR reception using a C-RNTI instead of an RA-RNTI within the RAR window, so that the user apparatus UE regards reception of an RAR addressed to itself as completion of the RA procedure.

The user apparatus UE may always return a MAC-ACK/NACK for a MAC PDU, or the user apparatus UE may feed back a MAC-ACK/NACK for a MAC PDU to the base station eNB only when a MAC SDU is multiplexed.

(Apparatus Configuration Example)

In the following, functional configurations of the user apparatus UE and the base station eNB (assuming SeNB in the present embodiment) that perform processing in the embodiment of the present invention described so far are described. By the way, the configuration of each apparatus described below indicates a configuration especially related to the present embodiment. Each of the user apparatus UE and the base station SeNB includes functions, as its basic functions, for executing operations defined in Rel-12 of LTE and the like.

Figure 18:
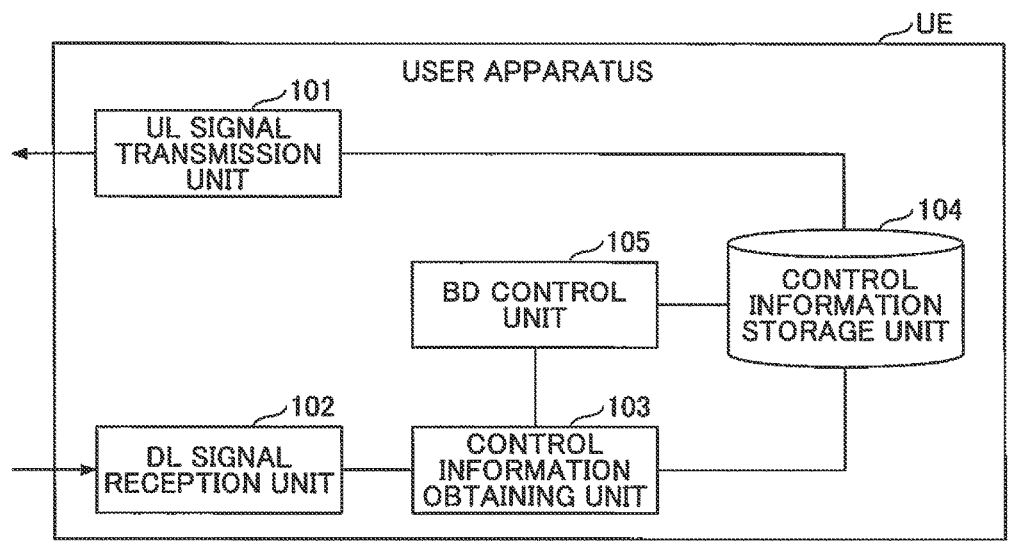
FIG. 18 is a functional block diagram of a user apparatus UE.

FIG. 18 shows a functional block diagram of the user apparatus UE. As shown in FIG. 18, the user apparatus UE includes an UL signal transmission unit 101, a DL signal reception unit 102, a control information obtaining unit 103, a control information storage unit 104, and a BD control unit 105.

The UL signal transmission unit 101 transmits a radio signal to the base station eNB. The DL signal reception unit 102 receives a radio signal from the base station eNB. The control information obtaining unit 103 obtains control information from a signal received from the DL signal reception unit 102. The control information obtaining unit 103 performs processing including BD and RAR reception (obtaining) described so far.

The control information storage unit 104 stores control information obtained by the control information obtaining unit 103. This control information includes information transmitted by RRC signaling, system information, dynamic resource assignment information and the like. Also, the control information storage unit 104 stores information that is set beforehand in a fixed manner, and the like. The UL signal transmission unit 101 performs transmission of an uplink signal using a predetermined resource based on control information (assignment information and the like) stored in the control information storage unit 104. The BD control unit 105 monitors an Ra-Response window and the like, and instructs the control information obtaining unit 103 to start/end BD reduction and the like so as to perform control of reduction of the number of BDs. That is, the BD control unit 105 performs control related to BD number reduction in the user apparatus UE described so far. Also, as described above, the DL signal reception unit 102 performs separation, by subheader, for the MAC PDU in which an RAR and a MAC SDU are multiplexed, and, as to the case of the example 1, the DL signal reception unit 102 determines the MAC PDU in which an RAR and a MAC SDU are multiplexed to be invalid.

Figure 19:
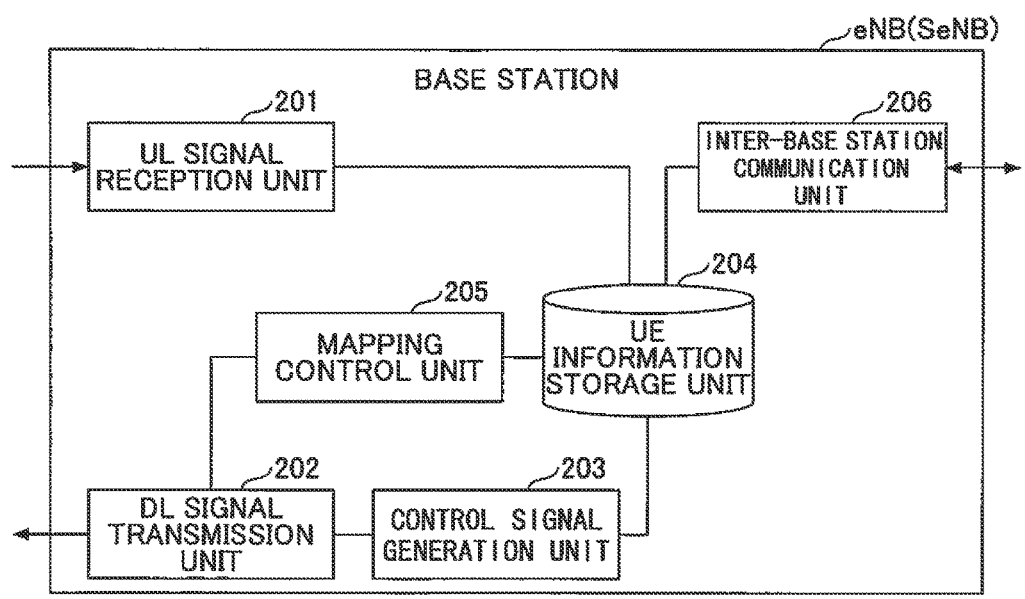
FIG. 19 is a functional block diagram of a base station SeNB.

FIG. 19 shows a functional configuration of the base station eNB in the present embodiment. As shown in FIG. 19, the base station eNB includes an UL signal reception unit 201, a DL signal transmission unit 202, a control information generation unit 203, a UE information storage unit 204, a mapping control unit 205 and an inter-base station communication unit 206.

The UL signal reception unit 201 receives a radio signal from a user apparatus UE. The DL signal transmission unit 202 transmits a radio signal to the user apparatus UE. The control information generation unit 203 generates control information such as assignment information based on information (including table, identification information, reception quality, configuration, CA state and the like) of the user apparatus UE stored in the UE information storage unit 204. Also, as described so far, the control information generation unit 203 determines a C-RNTI from a preamble to generate a DCI in which CRC is scrambled by the C-RNTI, and the like. As described so far, the mapping control unit 205 performs determination of Aggregation level, mapping of DCI, to USS, in which CRC is scrambled with C-RNTI and the like according to the state of the user apparatus UE.

When the UL signal reception unit 201 receives UE information such as reception quality information and the like from the user apparatus UE, the UL signal reception unit 201 stores it in the UE information storage unit 204. Also, the inter-base station communication unit 206 performs communication with another base station (MeNB, SeNB) via a backhaul circuit so as to perform transmission and reception of information of connected user apparatuses UE and the like. Also, as described above, the DL signal transmission unit 202 performs transmission of a MAC PDU in which an RAR and a MAC SDU are multiplexed.

The apparatus configurations for realizing processing of the present embodiment are not limited to the above-mentioned ones. For example, the following configurations can be adopted. Following configurations are substantially the same as those described so far.

That is, the user apparatus of the present embodiments is a user apparatus that communicates with a base station in a mobile communication system, including:

a reception unit configured to receive a radio signal from the base station by a downlink control channel; and a control information detection unit configured to detect control information, addressed to the user apparatus, mapped to a predetermined area in a time frequency resource of the downlink control channel by performing blind decoding in a plurality of candidate areas which are candidates of the predetermined area, wherein, the plurality of candidate areas are divided into a common candidate area where a plurality of user apparatuses commonly perform blind decoding and an individual candidate area for the user apparatus, and the control information detection unit performs blind decoding in the individual candidate area without performing blind decoding in the common candidate area during a period when the user apparatus monitors a random access response.

According to this configuration, it becomes possible to decrease the number of candidates that become targets of blind decoding performed when receiving control information transmitted by a downlink control channel in a user apparatus.

In a case where the user apparatus performs a contention based random access procedure, the user apparatus selects a preamble from a holding preamble group and transmits the preamble to the base station, and the control information detection unit performs blind decoding in the individual candidate area by using identification information of the user apparatus corresponding to the preamble during a period when the user apparatus monitors a random access response.

In a case where the user apparatus performs a non-contention based random access procedure, the control information detection unit performs blind decoding in the individual candidate area by using identification information of the user apparatus held by the user apparatus during a period when the user apparatus monitors a random access response.

According to the above-mentioned configurations, since it is eliminated to perform blind decoding in the CSS for receiving a random access response from the SeNB, increase of the number of candidates of blind decoding can be avoided.

Also, the reception unit receives a MAC PDU, from the base station, in which a random access response and a MAC SDU are multiplexed, and separates the random access response and the MAC SDU based on subheader information of the MAC PDU. According to such a configuration, for example, the base station can continue scheduling even when an RA procedure is being executed.

Also, the base station of the present embodiment is a base station that performs communication with a user apparatus in a mobile communication system, including:

a mapping unit configured to map control information, addressed to the user apparatus, to a predetermined area in a time frequency resource of a downlink control channel; and a transmission unit configured to transmit the control information, as a radio signal, by a downlink control channel using a time frequency resource of the predetermined area, wherein the predetermined area is an area among a plurality of candidate areas where blind decoding is performed for detecting the control information in the user apparatus, the plurality of candidate areas are divided into a common candidate area where a plurality of user apparatuses commonly perform blind decoding and an individual candidate area for the user apparatus, and the mapping unit selects the predetermined area from the individual candidate area at least during a period when the user apparatus monitors a random access response.

When the user apparatus performs a contention based random access procedure, the base station receives, from the user apparatus, a preamble selected from a preamble group held by the user apparatus so as to perform scramble of the control information using identification information of the user apparatus corresponding to the preamble.

Also, when the user apparatus performs a non-contention based random access procedure, the base station performs scramble of the control information using identification information of the user apparatus that is held by the base station.

According to the above-mentioned configurations, since it is eliminated to perform blind decoding in the CSS for receiving a random access response from the SeNB in the user apparatus, increase of the number of candidates of blind decoding can be avoided.

The transmission unit transmits a MAC PDU in which a random access response and a MAC SDU are multiplexed. According to such a configuration, for example, the base station can continue scheduling even when an RA procedure is being executed.

The user apparatus UE described in the present embodiment may include a CPU and a memory and may be realized by executing a program by the CPU (processor), or may be realized by hardware such as hardware circuits including logics of processing described in the present embodiment, or may be configured by coexistence of a program and hardware.

The base station eNB described in the present embodiment may include a CPU and a memory and may be realized by executing a program by the CPU (processor), or may be realized by hardware such as hardware circuits including logics of processing described in the present embodiment, or may be configured by coexistence of a program and hardware.

In the above, an embodiment of the present invention has been explained while referring to the specific embodiments. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus and the base station have been explained by using functional block diagrams. However, such an apparatus may be implemented in hardware, software, or a combination thereof. The software executed by a processor provided in the user apparatus according to the present embodiment, and the software executed by a processor provided in the base station according to the present embodiment may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international patent application claims priority based on Japanese patent application No. 2014-016208, filed in the JPO on Jan. 30, 2014, and the entire contents of the Japanese patent application No. 2014-016208 are incorporated herein by reference.

DESCRIPTION OF REFERENCE SIGNS

MeNB, SeNB base station
UE user apparatus
101 UL signal transmission unit
102 DL signal reception unit
103 control information obtaining unit
104 control information storage unit
105 BD control unit
201 UL signal reception unit
202 DL signal transmission unit
203 control information generation unit
204 UE information storage unit
205 mapping control unit
206 inter-base station communication unit

The invention claimed is:
1. A user apparatus that communicates with a base station in a mobile communication system, comprising:
  a receiver that receives a radio signal from the base station by a downlink control channel;
  a mapping table holding a preamble and identification information of the user apparatus by associating them, wherein the mapping table is also included in the base station; and
  a processor that detects control information, addressed to the user apparatus, mapped to a predetermined area in a time frequency resource of the downlink control channel by performing blind decoding in a plurality of candidate areas which are candidates of the predetermined area,
  wherein, the plurality of candidate areas are divided into a common candidate area where a plurality of user apparatuses commonly perform blind decoding and an individual candidate area for the user apparatus,
  the processor performs blind decoding in the individual candidate area without performing blind decoding in the common candidate area during a period when the user apparatus monitors a random access response,
  wherein, in a case where the user apparatus performs a contention based random access procedure, the user apparatus selects a preamble from a preamble group held in the mapping table of the user apparatus and transmits the preamble to the base station, and the processor performs, during a period when the user apparatus monitors a random access response, blind decoding in the individual candidate area by using identification information of the user apparatus for control information that is scrambled by the base station using the identification information of the user apparatus corresponding to the preamble selected from the mapping table of the base station.

2. The user apparatus as claimed in claim 1, wherein, in a case where the user apparatus performs a non-contention based random access procedure, the processor performs blind decoding in the individual candidate area by using identification information of the user apparatus held by the user apparatus during a period when the user apparatus monitors a random access response.

3. The user apparatus as claimed in claim 2, wherein the receiver receives a MAC PDU, from the base station, in which a random access response and a MAC SDU are multiplexed, and separates the random access response and the MAC SDU based on subheader information of the MAC PDU.

4. The user apparatus as claimed in claim 1, wherein the receiver receives a MAC PDU, from the base station, in which a random access response and a MAC SDU are multiplexed, and separates the random access response and the MAC SDU based on subheader information of the MAC PDU.

5. A base station that performs communication with a user apparatus in a mobile communication system, comprising:
   a processor that maps control information, addressed to the user apparatus, to a predetermined area in a time frequency resource of a downlink control channel;
   a transmitter that transmits the control information, as a radio signal, by a downlink control channel using a time frequency resource of the predetermined area, and
   a mapping table holding a preamble and identification information of the user apparatus by associating them, wherein the mapping table is also included in the user apparatus; and
   wherein the predetermined area is an area among a plurality of candidate areas where blind decoding is performed for detecting the control information in the user apparatus,
   the plurality of candidate areas are divided into a common candidate area where a plurality of user apparatuses commonly perform blind decoding and an individual candidate area for the user apparatus, and
   the processor selects the predetermined area from the individual candidate area during a period when the user apparatus monitors a random access response,
   wherein, when the user apparatus performs a contention based random access procedure, the base station receives, from the user apparatus, a preamble selected from a preamble group held in the mapping table of the user apparatus so as to select identification of the user apparatus corresponding to the preamble from the mapping table of the base station and to perform scramble of the control information using the identification of information of the user apparatus.

6. The base station as claimed in claim 5, wherein, when the user apparatus performs a non-contention based random access procedure, the base station performs scramble of the control information using identification information of the user apparatus that is held by the base station.

7. The base station as claimed in claim 6, wherein the transmitter transmits a MAC PDU in which a random access response and a MAC SDU are multiplexed.

8. The base station as claimed in claim 5, wherein the transmitter transmits a MAC PDU in which a random access response and a MAC SDU are multiplexed.

9. A control information detection method executed by a user apparatus that communicates with a base station in a mobile communication system, comprising:
   a reception step of receiving a radio signal from the base station by a downlink control channel; and
   a control information detection step of detecting control information, addressed to the user apparatus, mapped to a predetermined area in a time frequency resource of the downlink control channel by performing blind decoding in a plurality of candidate areas which are candidates of the predetermined area,
   a step of holding in a mapping table a preamble and identification information of the user apparatus by associating them, wherein the mapping table is also included in the base station,
   wherein, the plurality of candidate areas are divided into a common candidate area where a plurality of user apparatuses commonly perform blind decoding and an individual candidate area for the user apparatus, and
   in the control information detection step, the user apparatus performs blind decoding in the individual candidate area without performing blind decoding in the common candidate area during a period when the user apparatus monitors a random access response,
   wherein, in a case where the user apparatus performs a contention based random access procedure, the user apparatus selects a preamble from a preamble group held in the mapping table of the user apparatus and transmits the preamble to the base station, and
   the user apparatus performs, during a period when the user apparatus monitors a random access response, blind decoding in the individual candidate area by using identification information of the user apparatus for control information that is scrambled by the base station using the identification information of the user apparatus corresponding to the preamble selected from the mapping table of the base station.

10. A control information transmission method executed by a base station that performs communication with a user apparatus in a mobile communication system, comprising:
    a mapping step of mapping control information, addressed to the user apparatus, to a predetermined area in a time frequency resource of a downlink control channel; and
    a transmission step of transmitting the control information, as a radio signal, by a downlink control channel using a time frequency resource of the predetermined area,
    a step of holding in a mapping table a preamble and identification information of the user apparatus by associating them, wherein the mapping table is also included in the user apparatus,
    wherein the predetermined area is an area among a plurality of candidate areas where blind decoding is performed for detecting the control information in the user apparatus,
    the plurality of candidate areas are divided into a common candidate area where a plurality of user apparatuses commonly perform blind decoding and an individual candidate area for the user apparatus, and in the mapping step, the base station selects the predetermined area from the individual candidate area during a period when the user apparatus monitors a random access response, wherein, when the user apparatus performs a contention based random access procedure, the base station receives, from the user apparatus, a preamble selected from a preamble group held in the mapping table of the user apparatus so as to select identification of the user apparatus corresponding to the preamble from the mapping table of the base station and to perform scramble of the control information using the identification information of the user apparatus.

\* \* \* \* \*